United States Patent
Lee et al.

(10) Patent No.: US 12,009,520 B2
(45) Date of Patent: Jun. 11, 2024

(54) SECONDARY LITHIUM BATTERY ANODE AND SECONDARY LITHIUM BATTERY INCLUDING SAME

(71) Applicant: Samsung SDI Co., Ltd., Yongin-si (KR)

(72) Inventors: Jungmin Lee, Yongin-si (KR); Ilkyong Kwon, Yongin-si (KR); Myungseop Kim, Yongin-si (KR); Yuhyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 840 days.

(21) Appl. No.: 17/050,790

(22) PCT Filed: Mar. 15, 2019

(86) PCT No.: PCT/KR2019/003038
§ 371 (c)(1),
(2) Date: Oct. 26, 2020

(87) PCT Pub. No.: WO2019/208928
PCT Pub. Date: Oct. 31, 2019

(65) Prior Publication Data
US 2021/0075015 A1  Mar. 11, 2021

(30) Foreign Application Priority Data
Apr. 26, 2018 (KR) .................. 10-2018-0048587

(51) Int. Cl.
*H01M 4/583* (2010.01)
*H01M 4/04* (2006.01)
(Continued)

(52) U.S. Cl.
CPC .......... *H01M 4/583* (2013.01); *H01M 4/0404* (2013.01); *H01M 4/623* (2013.01); *H01M 10/0525* (2013.01)

(58) Field of Classification Search
CPC .... H01M 4/583; H01M 4/0404; H01M 4/623; H01M 10/0525
See application file for complete search history.

(56) References Cited

U.S. PATENT DOCUMENTS

| 5,631,100 A | 5/1997 | Yoshino et al. |
| 7,052,629 B2 | 5/2006 | Maeda et al. |
| (Continued) | | |

FOREIGN PATENT DOCUMENTS

| JP | 5-226004 A | 9/1993 |
| JP | 10-270047 A | 10/1998 |
| (Continued) | | |

OTHER PUBLICATIONS

Korean Notice of Allowance dated Mar. 4, 2021, issued in corresponding Korean Patent Application No. 10-2018-0048587 (5 pages).
(Continued)

*Primary Examiner* — Karie O'Neill Apicella
(74) *Attorney, Agent, or Firm* — Lewis Roca Rothgerber Christie LLP

(57) ABSTRACT

Disclosed are a secondary lithium battery anode and a secondary lithium battery including same, the secondary lithium battery anode comprising a current collector and an anode active material layer located on at least one surface of the current collector, wherein the anode active material layer includes an anode active material, which has sphericity of 0.83 to 0.91, and a binder, which has an average particle diameter (D50) of 180 nm to 450 nm.

6 Claims, 1 Drawing Sheet

(51) Int. Cl.
*H01M 4/62* (2006.01)
*H01M 10/0525* (2010.01)

(56) References Cited

U.S. PATENT DOCUMENTS

| | | | |
|---|---|---|---|
| 8,211,574 B2 | 7/2012 | Suzuki et al. | |
| 8,877,376 B2 | 11/2014 | Wakizaka et al. | |
| 9,153,820 B2 | 10/2015 | Sakamoto et al. | |
| 9,583,278 B2 | 2/2017 | Miyauchi et al. | |
| 10,014,528 B2 | 7/2018 | Maeda et al. | |
| 10,224,549 B2 | 3/2019 | Sasaki | |
| 10,446,850 B2 | 10/2019 | Momose et al. | |
| 2006/0115730 A1 | 6/2006 | Taniguchi et al. | |
| 2007/0275302 A1 | 11/2007 | Sotowa et al. | |
| 2007/0287064 A1 | 12/2007 | Suzuki et al. | |
| 2009/0023065 A1 | 1/2009 | Hwang et al. | |
| 2011/0039163 A1 | 2/2011 | Deguchi et al. | |
| 2011/0200886 A1 | 8/2011 | Deguchi | |
| 2011/0281163 A1 | 11/2011 | Kasamatsu et al. | |
| 2012/0219863 A1 | 8/2012 | Takahashi et al. | |
| 2013/0330636 A1 | 12/2013 | Deguchi | |
| 2014/0170486 A1 | 6/2014 | Matsumura et al. | |
| 2014/0248534 A1 | 9/2014 | Chikugo et al. | |
| 2015/0024283 A1* | 1/2015 | Deguchi | H01M 4/502 |
| | | | 429/332 |
| 2015/0125746 A1 | 5/2015 | Sonobe et al. | |
| 2015/0132644 A1 | 5/2015 | Sonobe et al. | |
| 2015/0187516 A1 | 7/2015 | Miyauchi et al. | |
| 2016/0043389 A1* | 2/2016 | Deguchi | H01M 10/052 |
| | | | 429/200 |
| 2016/0344028 A1 | 11/2016 | Nakagawa | |

FOREIGN PATENT DOCUMENTS

| | | |
|---|---|---|
| JP | 11-149929 A | 6/1999 |
| JP | 11-167921 A | 6/1999 |
| JP | 11-297329 A | 10/1999 |
| JP | 2005-25991 A | 1/2005 |
| JP | 2006-185887 A | 7/2006 |
| JP | 2006-260782 A | 9/2006 |
| JP | 2009-26760 A | 2/2009 |
| JP | 2010-21113 A | 1/2010 |
| JP | 2010-33803 A | 2/2010 |
| JP | 4473967 B2 | 6/2010 |
| JP | 2010-146808 A | 7/2010 |
| JP | 2010-192434 A | 9/2010 |
| JP | 2010-245035 A | 10/2010 |
| JP | 2010-287472 A | 12/2010 |
| JP | 4602254 B2 | 12/2010 |
| JP | 2011-108467 A | 6/2011 |
| JP | 2011-154982 A | 8/2011 |
| JP | 2011-171180 A | 9/2011 |
| JP | 2011-171181 A | 9/2011 |
| JP | 2011-198548 A | 10/2011 |
| JP | 2012-14929 A | 1/2012 |
| JP | 2012-38597 A | 2/2012 |
| JP | 2012-146684 A | 8/2012 |
| JP | 2012-169292 A | 9/2012 |
| JP | 5089828 B2 | 12/2012 |
| JP | 2013-41819 A | 2/2013 |
| JP | 2013-48013 A | 3/2013 |
| JP | 2013-55044 A | 3/2013 |
| JP | 2013-73921 A | 4/2013 |
| JP | 2013-182765 A | 9/2013 |
| JP | 2013-218967 A | 10/2013 |
| JP | 5361271 B2 | 12/2013 |
| JP | 2014-29788 A | 2/2014 |
| JP | 2014-29850 A | 2/2014 |
| JP | 5446762 B2 | 3/2014 |
| JP | 5477610 B2 | 4/2014 |
| JP | 2014-89834 A | 5/2014 |
| JP | 2014-103122 A | 6/2014 |
| JP | 2014-146471 A | 8/2014 |
| JP | 2014-160651 A | 9/2014 |
| JP | 2014-212132 A | 11/2014 |
| JP | 2014-212133 A | 11/2014 |
| JP | 5626209 B2 | 11/2014 |
| JP | 2014-239070 A | 12/2014 |
| JP | 5651346 B2 | 1/2015 |
| JP | 2015-207347 A | 11/2015 |
| JP | 5809636 B2 | 11/2015 |
| JP | 2015-229741 A | 12/2015 |
| JP | 5835682 B2 | 12/2015 |
| JP | 5862562 B2 | 2/2016 |
| JP | 5914811 B2 | 5/2016 |
| JP | 5942992 B2 | 6/2016 |
| JP | 2016-154107 A | 8/2016 |
| JP | 2016-154108 A | 8/2016 |
| JP | 5991321 B2 | 9/2016 |
| JP | 6011608 B2 | 10/2016 |
| JP | 6015649 B2 | 10/2016 |
| JP | 2016-219181 A | 12/2016 |
| KR | 10-2006-0103277 A | 9/2006 |
| KR | 10-2011-0098850 A | 9/2011 |
| KR | 10-2012-0103575 A | 9/2012 |
| WO | WO 2006/085416 A1 | 8/2006 |
| WO | WO 2010/113419 A1 | 10/2010 |
| WO | WO 2011/039949 A1 | 4/2011 |
| WO | WO 2011/080884 A1 | 7/2011 |
| WO | 2012/132393 A1 | 10/2012 |
| WO | WO 2013/069280 A1 | 5/2013 |
| WO | WO 2013/129571 A1 | 9/2013 |
| WO | WO 2013/147007 A1 | 10/2013 |
| WO | WO 2013/183717 A1 | 12/2013 |
| WO | WO 2013/191239 A1 | 12/2013 |
| WO | WO 2014/002883 A1 | 1/2014 |
| WO | WO 2014/021401 A1 | 2/2014 |
| WO | WO 2014/051067 A1 | 4/2014 |
| WO | WO 2014/057749 A1 | 4/2014 |
| WO | WO 2014/147983 A1 | 9/2014 |

OTHER PUBLICATIONS

International Search Report for corresponding International Application PCT/KR2019/003038, dated Jun. 19, 2019, 3pp.

* cited by examiner

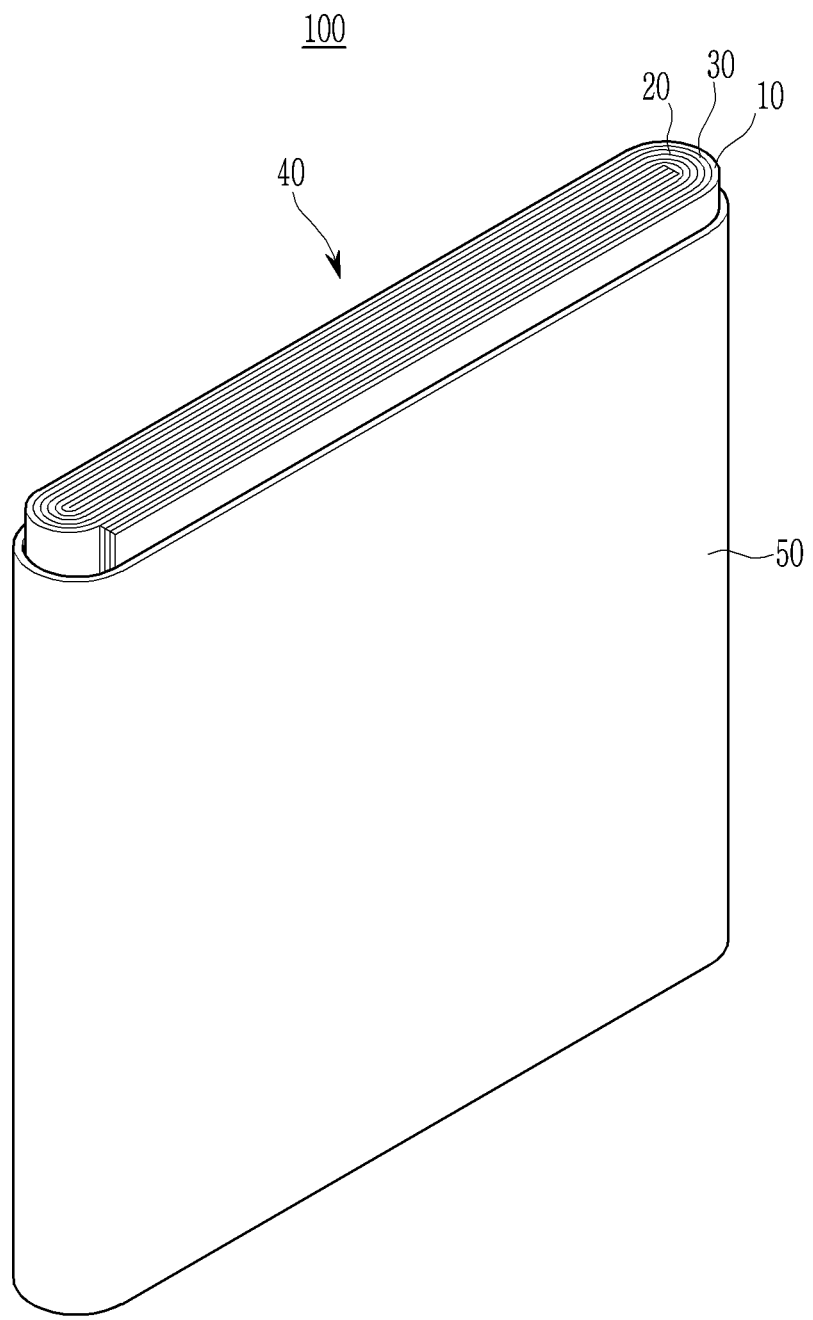

SECONDARY LITHIUM BATTERY ANODE AND SECONDARY LITHIUM BATTERY INCLUDING SAME

CROSS-REFERENCE TO RELATED APPLICATIONS

This application is a National Phase Patent Application of International Patent Application Number PCT/KR2019/003038, filed on Mar. 15, 2019, which claims priority of Korean Patent Application No. 10-2018-0048587, filed Apr. 26, 2018. The entire contents of both of which are incorporated herein by reference.

TECHNICAL FIELD

This disclosure relates to a secondary lithium battery anode and a secondary lithium battery including the same.

BACKGROUND ART

A secondary lithium battery which has recently drawn attention as a power source for small portable electronic devices uses an organic electrolyte solution and thereby has twice or more as high a discharge voltage than a conventional battery using an alkali aqueous solution, and accordingly, has high energy density.

Such secondary lithium battery includes a cathode, an anode, and an electrolyte.

The cathode and the anode include an active material layer and a current collector supporting the active material layer, and the active material layer may include an active material and a binder.

The binder provides adherence of active material particles with one another and adherence between the active material layer and the current collector, and the adherence is an important factor influencing the battery performance as the repeated charging and discharging continues as well as the electrode production properties. Thus, various studies on imparting the adherence have been attempted.

Technical Problem

One embodiment provides an anode for a secondary lithium battery having a good cycle-life characteristic by exhibiting excellent adherence.

Other embodiment provides a secondary lithium battery including the anode.

Technical Solution

An anode for a secondary lithium battery according to one embodiment includes: a current collector and an anode active material layer located on at least one surface of the current collector, wherein the anode active material layer may include an anode active material having sphericity of 0.83 to 0.91; and a binder having an average a particle diameter (D50) of 180 nm to 450 nm.

A secondary lithium battery according to one embodiment includes a cathode, an anode, and an electrolyte, and the anode may be the anode for the secondary lithium battery according to one embodiment.

Advantageous Effects

One embodiment reduces the phenomenon of penetrating the binder between a surface gap of the anode active material, in other words, increases the effective bonding area of the binder, thereby providing an electrode for a secondary lithium battery exhibiting the improved electrode adherence.

Furthermore, as the anode is applied, a secondary lithium battery exhibiting high energy density and a long cycle-life may be realized.

BRIEF DESCRIPTION OF THE DRAWING

FIG. 1 is a drawing schematically showing a structure of a secondary lithium battery according to one embodiment.

MODE FOR INVENTION

Hereinafter, the present disclosure of various embodiments will be described more fully with reference to the accompanying drawing, in order for one of ordinary skill in the related art to readily perform it. The present invention may be embodied in many different forms and is not to be construed as limited to the embodiments set forth herein.

In order to clearly illustrate the present invention, parts that are not related to the description are omitted, and the same or similar elements are denoted by the same reference numerals throughout the specification.

Furthermore, sizes and thicknesses of each element in the drawings are arbitrarily expressed for convenience of description, and thus, the present invention is not limited by the drawings.

In addition, unless explicitly described to the contrary, the word "comprise" and variations such as "comprises" or "comprising" will be understood to imply the inclusion of stated elements but not the exclusion of any other elements.

An anode for a secondary lithium battery according to one embodiment includes a current collector and an anode active material layer located on at least one surface of the current collector, and the anode active material layer may include an anode active material having sphericity of 0.83 to 0.91, and a binder having an average particle diameter (D50) of 180 nm to 450 nm.

The anode current collector may be a copper foil, a nickel foil, a stainless steel foil, a titanium foil, a nickel foam, a copper foam, a polymer substrate coated with a conductive metal, and a combination thereof.

The anode active material layer may include an anode active material and a binder.

The binder has an average particle diameter (D50) of 180 nm to 450 nm, and more specifically, of 200 nm to 400 nm. As such, the one embodiment uses the binder having a larger average particle diameter (D50) than the conventional binder having an average particle diameter (D50) of about 150 nm or less so that the penetration of the binder between the gap which may be generated on the surface of the anode active material may be effectively prevented. Such effect may be more effectively obtained from the average particle diameter (D50) of the binder satisfying the range, that is, the adherence between the current collector and the active material layer may be improved by more effectively preventing the decrease of the effective adherence area of the binder due to the penetration of the binder between the surface gap of the anode active material. In the present specification, unless otherwise defined, the average particle diameter (D50) refers to a diameter of particles having a cumulative volume of 50% by volume in the particle size distribution.

The binder may be a water dispersion binder.

The water dispersion binder may be polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, polyamideimide, polyimide, styrene-butadiene rubber, acrylated styrene-butadiene rubber, or a combination thereof.

The binder may be included at a range of 0.1 wt % to 2 wt %, and more specifically, 0.5 wt % to 1.5 wt %, as a reference of the total anode active material.

As described, the one embodiment uses the binder having a larger average particle diameter (D50) to prevent the shortcomings due to the penetration of the binder between the gap which may be generated on the surface of the anode active material, so that a relatively small amount of the binder may well adhere the anode active material particles to each other and may sufficiently provide adherence between the anode active material layer and the current collector. In addition, the small amount of the binder allows a reduction of the resistance of the anode active material layer, thereby improving the cycle-life characteristic.

In one embodiment, as a binder, the above-described binder having a larger average particle diameter (D50) is used, so that an anode active material having a non-uniform surface shape may be generally used.

The sphericity of the anode active material may be 0.83 to 0.91, and more specifically, 0.83 to 0.87. As such, the sphericity of the anode active material satisfies the above range, and such anode active material has a slightly non-uniform surface shape and a large specific surface area so that the active material has wide spaces in which lithium ions may be moved and excellent electrolyte impregnation. However, as the surface shape of the anode active material is non-uniform, the binder may penetrate between the non-uniform surfaces to reduce the effective adherence area which contacts materials for adhering so that it is not desired for use, but in one embodiment, such an active material is used together with the binder having a large average particle diameter (D50) of 180 nm to 450 nm to prevent the penetration of the binder between the surface of the anode active material, so that the active material having the sphericity may be used.

In one embodiment, the sphericity may be obtained using a sphericity measuring device, and as it is well known in the related arts, the detailed description thereof is omitted.

The anode active material may be a crystalline carbon-based anode active material, and for example, artificial graphite, natural graphite, or a combination thereof.

The amount of the anode active material may be 98 wt % to 99.9 wt % as a reference of the total anode active material layer.

In the present embodiment, the amount ratio of the anode active material and the binder may be a weight ratio of 95:5 to 99:1, and more specifically, in a 97:3 to 99:1 range. When the amount ratio of the anode active material and binder is within the above range, the desired adherence between the current collector and the active material layer may be secured.

Furthermore, the anode active material layer may further include a thickener. The thickener may provide viscosity to the binder, and for example, may include carboxymethyl cellulose, hydroxypropyl methylcellulose, methyl cellulose, or alkali metal salts thereof. The alkali metal may be Na, K, or Li.

When the anode active material layer further include the thickener, an amount of the anode active material may be 95 wt % to 99.8 wt %, an amount of the binder may be 0.1 wt % to 2 wt %, and an amount of the thickener may be 0.1 wt % to 3 wt %.

Furthermore, the anode active material layer may further include a conductive material. The conductive material is included to provide electrode conductivity, and any electrically conductive material may be used as a conductive material unless it causes a chemical change in a battery. Examples of the conductive material include a carbon-based material such as carbon black, acetylene black, ketjen black, denka black, a carbon fiber, and the like; a metal-based material of a metal powder or a metal fiber including copper, nickel, aluminum, silver, and the like; a conductive polymer such as a polyphenylene derivative; or a mixture thereof. When the anode active material layer further includes the conductive material, an amount of the anode active material may be 93 wt % to 99.7 wt %, an amount of the binder may be 0.1 wt % to 2 wt %, an amount of the thickener may be 0.1 wt % to 3 wt %, and an amount of the conductive material may be 0.1 wt % to 3 wt %.

Hereinafter, the secondary lithium battery according to another embodiment will be illustrated.

FIG. 1 schematically shows the structure of the secondary lithium battery according to one embodiment.

Referring to FIG. 1, the secondary lithium battery 100 according to one embodiment may include an electrode assembly 40 and a case 50 housing the electrode assembly 40.

The electrode assembly 40, as shown in FIG. 1, may be a flat structure obtained by interposing a separator 30 between a band-shaped cathode 10 and anode 20, spirally winding them, and compressing it to be flat. Or, even though not shown, it may be a structure in which a plurality of quadrangular sheet-shaped cathodes and anodes may be alternately stacked with a plurality of separators therebetween.

In one embodiment, the anode 20 may be the anode for the secondary lithium battery according to the above-described one embodiment. The detailed description for the anode is the same to the above description, and it is not illustrated.

Next, the cathode 10 includes a current collector and a cathode active material layer located on at least one surface of the current collector, and including a cathode active material.

In the cathode active material layer, as the cathode active material, a compound being capable of reversibly intercalating and deintercalating lithium (a lithiated intercalation compound) may be used. As a specific example, one or more composite oxides of a metal selected from cobalt, manganese, nickel, or a combination thereof, and lithium, may be used.

As more specific examples, compounds represented by one of the following chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $Li_aNi_{1-b-c}Co_bX_cD_\alpha$ ($0.90 \leq a \leq 8$, $0 \leq b \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}CO_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 0.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_xMn_dGeO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$).

In the chemical formulae, A is selected from Ni, Co, Mn, or a combination thereof; X is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; and J is selected from V, Cr, Mn, Co, Ni, Cu, or a combination thereof.

The compounds may also have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, or a hydroxyl carbonate of a coating element. The compound for the coating layer may be amorphous or crystalline.

The coating element included in the coating layer may include Mg, Al, Co, K, Na, Ca, Si, Ti, V, Sn, Ge, Ga, B, As, Zr, or a mixture thereof. The coating layer may be disposed in any method having no adverse influence on properties of a cathode active material by using these elements in the compound (for example, spray coating, dipping, and the like), but is not illustrated in more detail since it is well-known in the related field.

In the cathode, an amount of the cathode active material may be about 90 wt % to about 98 wt % based on a total weight of the cathode active material layer.

In one embodiment, the cathode active material layer may further include a binder and a conductive material. Herein, each amount of the binder and the conductive material may be about 1 wt % to about 5 wt % based on the total weight of the cathode active material layer.

The binder improves binding properties of cathode active material particles with one another and with a current collector, and examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity, and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

Meanwhile, the separator 30 may be any separator that is generally used in a secondary lithium battery which may separate the cathode 10 and the anode 20 and provide a transporting passage for lithium ions. In other words, it may have low resistance to transport ions of the electrolyte and excellent impregnation for an electrolyte. The separator 13 may be, for example, selected from a glass fiber, polyester, polyethylene, polypropylene, polytetrafluoroethylene, or a combination thereof, and it may have a form of a non-woven fabric or a woven fabric. Or, in order to ensure the heat resistance or mechanical strength, a separator formed with a coating layer including a ceramic component or a polymer material may be used, and optionally, it may have a mono-layered or multi-layered structure.

The cathode 10, the anode 20, and the separator 30 may be impregnated in the electrolyte solution (not shown).

The electrolyte solution includes a non-aqueous organic solvent and a lithium salt.

The non-aqueous organic solvent serves as a medium for transmitting ions taking part in the electrochemical reaction of a battery.

The non-aqueous organic solvent may include a carbonate-based, an ester-based, an ether-based, a ketone-based, an alcohol-based, or an aprotic solvent. The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may be methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone and the like. Furthermore, the alcohol-based solvent may be ethanol, isopropyl alcohol, and the like, and the aprotic solvent may be nitriles such as R-CN (wherein R is a C2 to C20 linear, branched, or cyclic hydrocarbon group, or may include a double bond aromatic ring, or an ether bond), amides such as dimethyl formamide and the like, dioxolanes such as 1,3-dioxolane and the like, and sulfolanes and the like.

The organic solvent may be used alone or in a mixture, and when the organic solvent is used in a mixture, a mixture ratio may be controlled in accordance with desirable battery performance, which may be understood by a person having ordinary skill in this art.

In addition, the carbonate-based solvent may include a mixture of a cyclic carbonate and a linear (chain) carbonate. In this case, when the cyclic carbonate and the linear carbonate are mixed together in a volume ratio of 1:1 to 1:9, performance of an electrolyte solution may be enhanced.

The organic solvent of the disclosure may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical Formula 1]

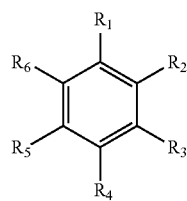

In Chemical Formula 1, $R_1$ to $R_6$ are the same or different and are selected from the group consisting of hydrogen, a halogen, a C1 to C10 alkyl group, a haloalkyl group, and a combination thereof.

Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula 2 as an additive for improving the cycle-life of a battery.

[Chemical Formula 2]

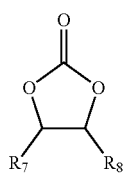

In Chemical Formula 2, $R_7$ and $R_8$ are the same or different and are selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in an organic solvent supplies a battery with lithium ions, basically operates the secondary lithium battery, and improves transportation of the lithium ions between a cathode and an anode. Examples of the lithium salt include one or two more selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example an integer ranging from 1 to 20), LiCl, LiI, and $LiB(C_2O_4)_2$ (lithium bis(oxalato) borate: LiBOB), as a supporting salt. A concentration of the lithium salt may range from 0.1 M to 2.0 M. When the lithium salt is included at the above concentration range, an electrolyte may have excellent performance and effective lithium ion mobility due to optimal electrolyte conductivity and viscosity.

Meanwhile, the secondary lithium battery according to an embodiment may be included in a device including at least one of the same. Such a device may be, for example, one of a mobile phone, a tablet computer, a laptop computer, a power tool, a wearable electronic device, an electric vehicle, a hybrid electric vehicle, a plug-in hybrid electric vehicle, and a power storage device. In this way, the device to which the secondary lithium battery is applied is well known in a related art and thus will not be specifically illustrated in the present specification.

EXAMPLES

Hereinafter, the specification will be specifically examined through examples.

Example 1

(1) Preparation of Anode 98 wt % of artificial graphite with sphericity of 0.85, 1 wt % of a carboxymethyl cellulose thickener, and 1 wt % of a water dispersion liquid (concentration: 40 wt %) of a styrene-butadiene rubber binder with an average particle diameter (D50) were mixed and distributed in water to prepare a composition for an anode active material layer.

The composition for the anode active material layer was coated on a copper foil current collector and dried, followed by compressing it to prepare an anode.

Examples 2 and 3 and Comparative Examples 1 to 7

An anode was prepared by the same procedure as in Example 1, except that the physical properties of the graphite and the binder were changed as in the following Table 1.

Experimental Example 1—Adherence Test

An adherence test was performed for the anodes of Examples 1 to 3 and Comparative Examples 1 to 7 according to the following method.

The adherence test was performed by the following method.

First, the prepared anode was prepared by cutting it to a size with a width of 25 mm and a length of 100 mm. A double-sided adhesive tape having an area with a width of 20 mm and a length of 40 mm was adhered to an acryl plate having an area with a width of 40 mm and a length of 100 mm. The prepared electrode was adhered to the double-sided adhesive tape, slightly pressed using a hand roller five times, the resultant was equipped on a UTM (20 kgf load cell) to peel off about 25 mm of one part of the anode, the anode was fixed on an upper clip of a tensile tester, and the tape adhered to the one part of the anode was fixed on a lower clip to peel off at a rate of 100 mm/min, thereby measuring 180 peel off strength. The adherence test was performed for five of each of the anodes which were obtained according to Examples 1 to 3 and Comparative Examples 1 to 7, the average value was calculated from the obtained results, and the results are shown in Table 1. In Table 1, the sphericity was measured by using a sphericity measurement device.

TABLE 1

| Division | Sphericity of graphite | Particle diameter of binder (nm) | Adherence (gf/mm) |
|---|---|---|---|
| Example 1 | 0.85 | 200 | 2.59 |
| Example 2 | 0.85 | 300 | 2.71 |
| Example 3 | 0.85 | 400 | 2.88 |

TABLE 1-continued

| Division | Sphericity of graphite | Particle diameter of binder (nm) | Adherence (gf/mm) |
|---|---|---|---|
| Comparative Example 1 | 0.92 | 150 | 1.86 |
| Comparative Example 2 | 0.92 | 500 | 1.29 |
| Comparative Example 3 | 0.92 | 200 | 1.55 |
| Comparative Example 4 | 0.92 | 300 | 1.36 |
| Comparative Example 5 | 0.92 | 400 | 1.23 |
| Comparative Example 6 | 0.82 | 300 | 1.84 |
| Comparative Example 7 | 0.85 | 150 | 1.22 |

Referring to Table 1, the anodes according to Examples 1 to 3 using the anode active material with the sphericity of 0.85 to 0.91 and the binder with the average particle diameter (D50) of 200 nm to 400 nm exhibited total excellent adherence between the current collector and the anode active material layer. However, Comparative Example 1 using the anode active material with the sphericity of 0.92 and the binder with the average particle diameter (D50) of 150 nm, and Comparative Example 2 using the anode active material with the sphericity of 0.92 and the binder with the average particle diameter (D50) of 500 nm exhibited deteriorated adherence. Furthermore, in case of using the anode active material having the sphericity of 0.92, or 0.82, like in Comparative Examples 3 to 6, the adherence was deteriorated, although the binder having the average particle diameter (D50) within the range of 180 nm to 450 nm was used.

Furthermore, Comparative Example 7 using the binder with the average particle diameter of 150 nm, even though the sphericity was 0.85, exhibited the deteriorated adherence.

From the results, the anodes of Comparative Examples 1 to 7 in which at least one of the sphericity of the anode active material and the average particle diameter (D50) of the binder was not satisfied exhibited the reduced adherence by at least 27% or more.

From the results, it was found that the anode using the anode active material with the sphericity of 0.83 to 0.91 and the binder with the average particle diameter (D50) of 180 nm to 450 nm exhibited excellent adherence between the current collector and the anode active material layer. Furthermore, it can be shown if at least one of the sphericity and the average particle diameter (D50) is not satisfied in the condition, the adherence is deteriorated. Thus, when the anode active material and the binder in which the sphericity and the average particle diameter (D50) are all satisfied, the adherence between the current collector and the anode active material layer may be significantly improved in the anode for the secondary lithium battery.

Experimental Example 2

Fabrication of Cell

Using anodes according to Examples 1 to 3 and Comparative Examples 1 to 7, a lithium metal counter electrode and an electrolyte solution, a half-cell was fabricated by the general method. As the electrolyte solution, 1.0 M $LiPF_6$ dissolved in a mixed solvent of ethylene carbonate and diethyl carbonate (50:50 volume ratio).

The half-cells according to Examples 1 to 3 and Comparative Examples 1 to 7 was charged and discharged at 0.1 C, and the charge capacity and the discharge capacity were measured to obtain the initial efficiency. Among the results, the results of Examples 1 and 3 and Comparative Examples 1, 2, and 7 are shown in Table 2. In Table 2, the initial efficiency was calculated as a percentage of the discharge capacity to the charge capacity.

TABLE 2

| Deviation | Initial efficiency (%) |
|---|---|
| Example 1 | 90.7 |
| Example 3 | 91.5 |
| Comparative Example 1 | 83.4 |
| Comparative Example 2 | 81.3 |
| Comparative Example 7 | 80.9 |

As shown in Table 2, the cells with the anode according to Examples 1 and 3 using the anode active material having the sphericity of 0.85 and the binder having an average particle diameter D50 of 200 nm and 400 nm exhibited excellent capacity retention. On the other hand, Comparative Examples 1, 2, and 7 in which the sphericity of the anode active materials and the average particle diameter D50 of the binder was out of at least one of ranges of 0.83 to 0.91, and 180 nm to 450 nm, respectively, exhibited deteriorated capacity retention.

The preferred examples related to this disclosure are illustrated by referring to the drawing, but this disclosure is not limited to the examples, and it includes all modifications from the examples of this disclosure within the scope equivalently recognized by those of ordinary skill in the related arts in the technology field in which the present invention belongs.

DESCRIPTION OF SYMBOLS

100: secondary lithium battery
10: cathode
20: anode
30: separator
50: case

The invention claimed is:

1. An anode for a secondary lithium battery, comprising:
   a current collector, and an anode active material layer located on at least one surface of the current collector,
   wherein the anode active material layer comprises an anode active material having sphericity of 0.83 to 0.91;
   a binder having an average particle diameter D50 of 180 nm to 450 nm, and
   adherence between the current collector and the anode active material layer is 2 pf/mm to 4 of/mm.

2. The anode for a secondary lithium battery of claim 1, wherein the sphericity of the anode active material is 0.83 to 0.87.

3. The anode for a secondary lithium battery of claim 1, wherein the average particle diameter D50 of the binder is 200 nm to 400 nm.

4. The anode for a secondary lithium battery of claim 1, wherein an amount ratio of the anode active material and the binder is 95:5 to 99:1 by weight ratio.

5. The anode for a secondary lithium battery of claim 1, wherein the anode active material is artificial graphite, natural graphite, or a combination thereof.

6. A secondary lithium battery comprising:
a cathode;
an anode; and
an electrolyte,
wherein the anode is the anode according to claim 1.

* * * * *